(12) United States Patent
Marquis

(10) Patent No.: US 6,364,425 B1
(45) Date of Patent: Apr. 2, 2002

(54) CAST WHEEL WITH HOLLOW CORE INSERT

(75) Inventor: Michael Marquis, Ypsilanti, MI (US)

(73) Assignee: Hayes Lemmerz International, Inc., Northville, MI (US)

(*) Notice: Subject to any disclaimer, the term of this patent is extended or adjusted under 35 U.S.C. 154(b) by 0 days.

(21) Appl. No.: 09/474,353

(22) Filed: Dec. 29, 1999

Related U.S. Application Data

(60) Provisional application No. 60/114,025, filed on Dec. 29, 1998.

(51) Int. Cl.[7] ................................................. B06B 3/06
(52) U.S. Cl. ............................................. 301/65; 301/95
(58) Field of Search ............................... 301/65, 95–98, 301/64.7

(56) References Cited

U.S. PATENT DOCUMENTS

| | | | | |
|---|---|---|---|---|
| 6,022 A | * | 1/1849 | Cook | 295/28 |
| 975,481 A | | 11/1910 | Tidnam | |
| 1,265,741 A | * | 5/1918 | Burrows et al. | 301/65 |
| 1,346,863 A | * | 7/1920 | Walther | 301/65 |
| 1,486,122 A | * | 3/1924 | Blank et al. | 301/65 |
| 1,684,552 A | * | 9/1928 | Weldrum | 301/65 |
| 3,288,423 A | | 11/1966 | Linden | |
| 3,341,167 A | | 9/1967 | Weiss | |
| 4,976,497 A | | 12/1990 | Post et al. | 301/37.43 |
| 5,538,329 A | * | 7/1996 | Stach | 301/65 |

FOREIGN PATENT DOCUMENTS

| | | | | |
|---|---|---|---|---|
| FR | 1087479 | * | 2/1955 | 301/65 |
| GB | 214813 | * | 5/1924 | 301/65 |
| JP | 143101 | * | 7/1985 | 301/65 |

* cited by examiner

Primary Examiner—Russell D. Stormer
(74) Attorney, Agent, or Firm—MacMillan, Sobanski & Todd, LLC

(57) ABSTRACT

Cast metal wheels, such as those made of aluminum and magnesium alloys generally have a thick cross section in the area where the wheel disc joins the rim. The disclosed invention is drawn to a device for reducing the weight of a cast metal vehicle wheel. The device includes an annular tube which is supported in the mold in the wheel is cast. The device is then cast within the wheel rim or disc and forms a hollow cavity inside the wheel which reduces the weight of the wheel.

12 Claims, 4 Drawing Sheets

US 6,364,425 B1

CAST WHEEL WITH HOLLOW CORE INSERT

CROSS REFERENCE TO RELATED APPLICATIONS

This application claims the benefit of U.S. Provisional Application No. 60/114,025, filed on Dec. 29, 1998.

BACKGROUND OF THE INVENTION

This invention relates in general to cast vehicle wheels and in particular to a cast vehicle wheel having a hollow core insert and a method for making same.

Light weight vehicle wheels formed from alloys of aluminum, magnesium and titanium are becoming increasingly popular. It is known in the art to cast a one piece vehicle wheel in a multi-piece wheel mold. Referring now to the drawings, there is shown in FIG. 1 a fragmentary sectional view of a typical prior art one piece wheel 10. The wheel 10 has a circular wheel disc 11 which extends across the outboard end of an annular wheel rim 12.

The wheel disc 11 includes a wheel hub 15 having a central pilot hole 16 and a plurality of wheel lug holes 17 (one shown) formed therethrough. The hub 15 is supported by a plurality of wheel spokes 18 (one shown) within an annular sidewall 20 which forms the outboard end of the wheel rim 12.

The wheel rim 12 includes an outboard tire bead retaining flange 21 which extends in a radial outward direction from the sidewall 20. The rim 12 further includes an outboard tire bead seat 22 which is formed in the sidewall 20 adjacent to the retaining flange 21. The rim 12 also includes an outboard tire bead hump 23 formed in the sidewall 20 between the tire bead seat 22 and a deep well 24. A leg portion 25 extends axially across the rim 12 from the deep well 24 to an inboard tire bead hump 26. An inboard tire bead seat 27 is formed adjacent to the bead hump 26. The inboard end of the wheel rim 12 terminates in a conventional inboard tire bead retaining flange 28.

It also is known in the art to fabricate a two piece vehicle wheel by attaching a full face wheel disc to the outboard end of a separately formed partial wheel rim. Typically, the wheel disc is cast while the rim is rolled from strip stock. Such two piece wheels are less expensive to manufacture than a cast one piece wheel while permitting use of stylistic designs for the wheel disc. Both the wheel disc and rim can be formed from alloys of the same light weight metal, or, as a further cost reduction, a wheel disc formed from an alloy of a light weight metal can be attached to a rim rolled from steel. When different metals are used to form the wheel disc and wheel rim, the wheel is usually called a bimetal wheel.

SUMMARY OF THE INVENTION

This invention relates to an improved cast vehicle wheel having a hollow core insert and a method for making same.

Due to the geometry of cast wheels, the wheel sidewall, the portion of the wheel where the wheel disc joins the wheel rim, tends to have a thick cross section. Accordingly, a large mass of metal is contained in the sidewall which adds to the wheel weight while not being needed for wheel strength. Therefore, it would be desirable to reduce the weight of the wheel sidewall.

The present invention contemplates a vehicle wheel including an annular wheel rim adapted to support a pneumatic tire and a circular wheel disc formed across an end of the rim, the wheel disc cooperating with the wheel rim to define an annular sidewall. The wheel also includes a hollow core disposed within the sidewall. The hollow core can be either a continuous core which extends circumferentially within the sidewall or a plurality of segments spaced equally about the circumference of the sidewall. The invention also contemplates a continuous or segmented hollow core disposed within the sidewall of a full face wheel disc.

The invention further contemplates a mold for casting a wheel component which includes a base member and a top core, the top core cooperating with the base member to define a wheel sidewall cavity. The mold also includes a hollow core disposed within the sidewall cavity. A supporting structure positions the hollow core within the sidewall cavity. The wheel component cast in the mold can be a one piece vehicle wheel or a full face wheel disc.

The invention also contemplates a method for casting a vehicle wheel component which includes providing a mold for the component, the mold defining a sidewall cavity. A hollow core is placed within the sidewall cavity. The mold is charged with molten metal and molten metal is allowed to cool and solidify. Finally, the mold is opened and the wheel component and core are removed.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
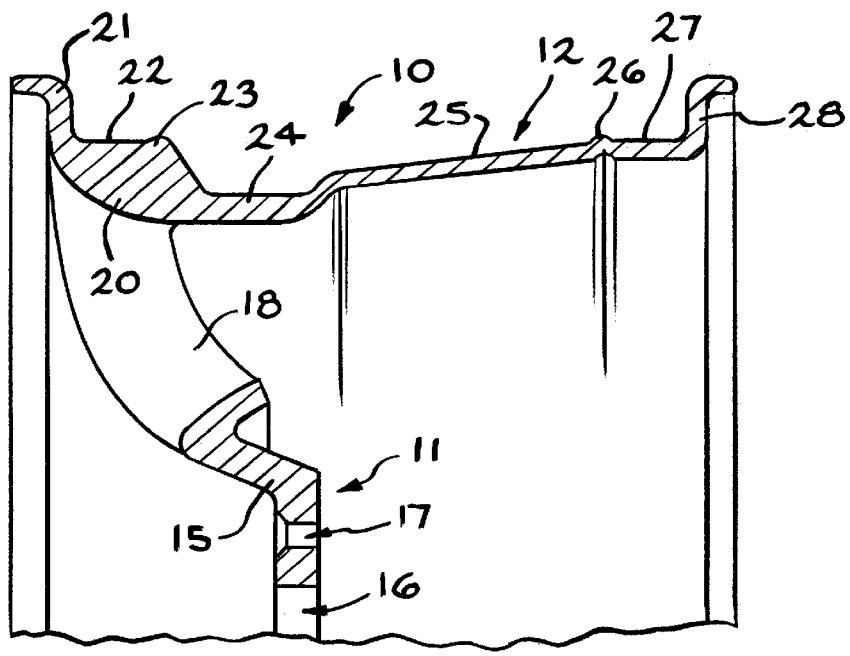
FIG. 1 is a fragmentary sectional view of a prior art one piece wheel.
Figure 2:
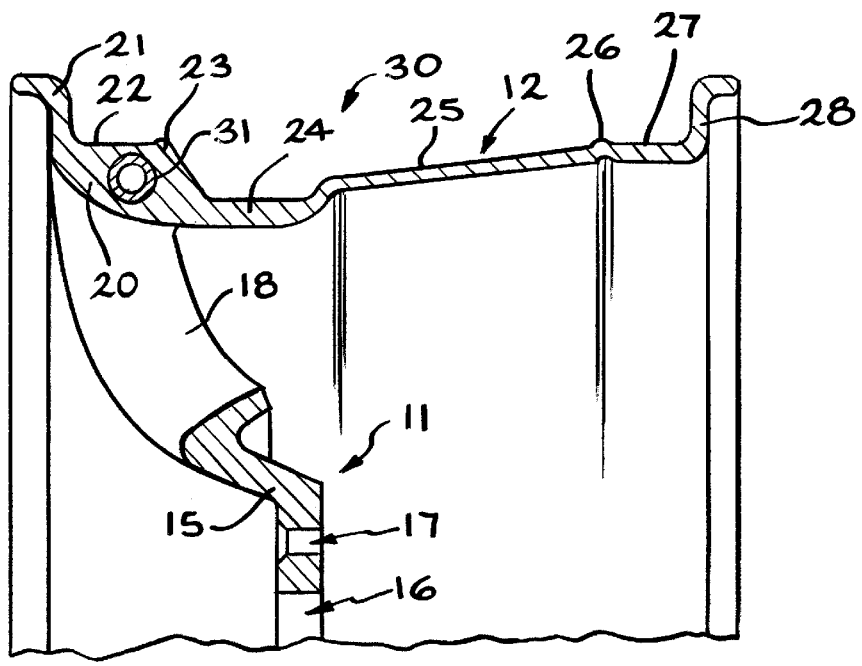
FIG. 2 is a fragmentary sectional view of an improved one piece wheel in accordance with the present invention.

Referring again to the drawings, there is illustrated in FIG. 2 an improved one piece wheel 30 in accordance with the invention. Components shown in FIG. 2 which are similar to components shown in FIG. 1 have the same numerical designators. The wheel 30 is cast from a light weight metal, such as alloys of aluminum, magnesium and titanium, and has a hollow annular lightener core 31 cast into the wheel sidewall 20. In the preferred embodiment, the core 31 is a sealed tube having a circular cross sectional shape; however, it will be appreciated that the invention also can be practiced with cores having other cross sectional shapes, such as for example, trapezoidal. Also, in the preferred embodiment, the core 31 is formed the same material as the wheel, for example a core formed from 6061 aluminum may be used with an aluminum alloy wheel. However, the core 31 also can be formed from ferrous, metallic or non-metallic materials depending upon the particular application.

Figure 3:
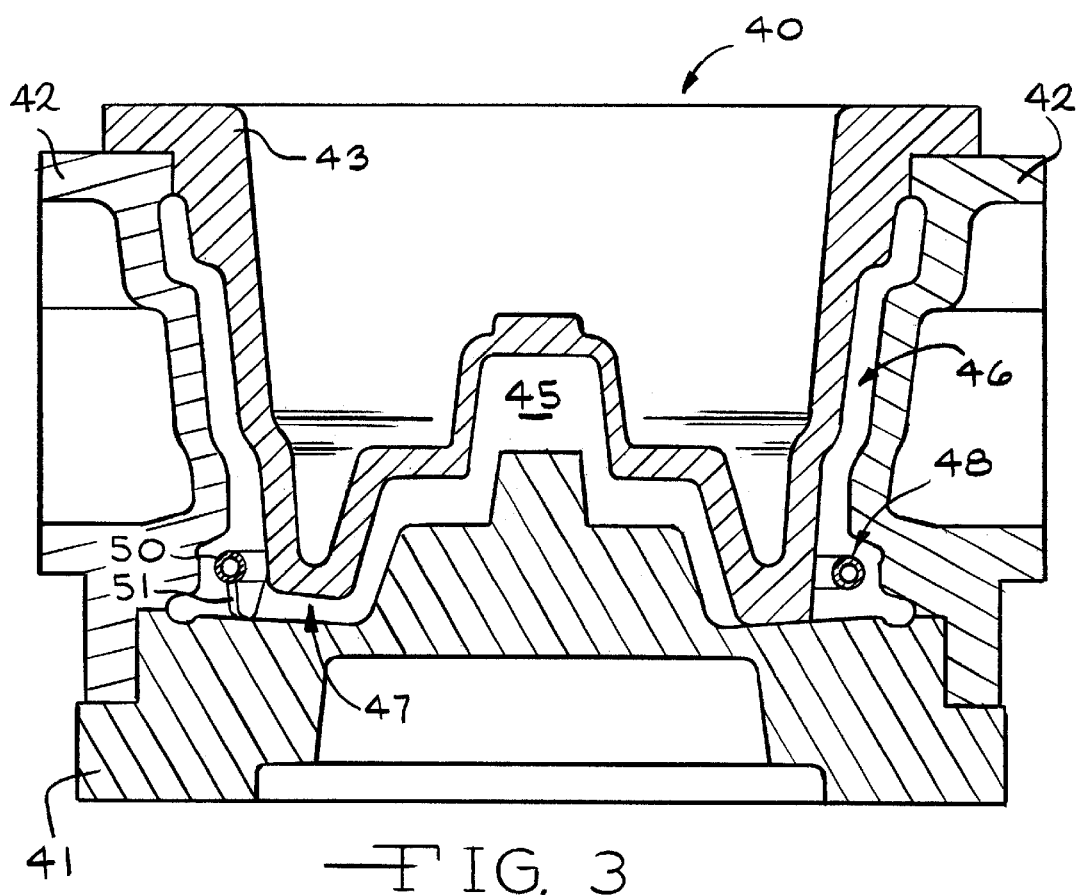
FIG. 3 is a sectional view of a multi-piece wheel mold which is used to cast the wheel shown in FIG. 2.

The invention also contemplates an apparatus for casting the wheel 30 shown in FIG. 2. The apparatus includes a multi-piece wheel mold 40 which is shown in FIG. 3. The mold 40 has a base member 41 which supports the other mold components. The mold 40 also includes a plurality of horizontally movable side members 42 (two shown) and a vertically movable top core 43. The base member cooperates with the side members 42 and top core 43 to define a mold cavity 45. For simplicity, the gate structure for pouring molten metal into the mold cavity 45 has been omitted from FIG. 3. Similarly, the mechanisms for moving the side members 42 and top core 43 are not shown in FIG. 3. The mold cavity 45 includes an annular rim cavity 46 and a circular disc cavity 47. The junction of the rim cavity 46 and disc cavity 47 defines an annular sidewall cavity 48.

A sealed hollow ring shaped core 50 is disposed in the sidewall cavity 48. In the preferred embodiment, the core 50 is formed from the same material as the wheel; however, the invention also can be practiced with the core 50 formed from a material which is different from the material forming the wheel. The core 50 is illustrated as having a circular cross sectional shape; however, it will be appreciated that the invention also can be practiced with cores having other cross sectional shapes.

As shown in FIG. 3, the core 50 is supported within the sidewall cavity 48 by a plurality of tabs 51 (one shown) which extend in a downward direction in FIG. 3. The tabs 51 cooperate with the base member 41 to position the core 50. It is contemplated that indentations (not shown) formed in the upper surface of the base member 41 receive the ends of the tabs 51 to position the core 50 within the sidewall cavity 48.

The invention also may be practiced with the tabs 51 extending in other directions (not shown). Such tabs also could be supported by other members of the mold 40 than the base member 41 (not shown). While tabs 51 are shown in FIG. 3, it will be appreciated that the invention also can be practiced utilizing other structures to support the core 50 within the sidewall cavity 48. Upon pouring a charge of molten metal into the mold cavity 45, the metal surrounds the core 50. Accordingly, the core 50 is cast into the sidewall of the resulting wheel casting (not shown).

Figure 4:
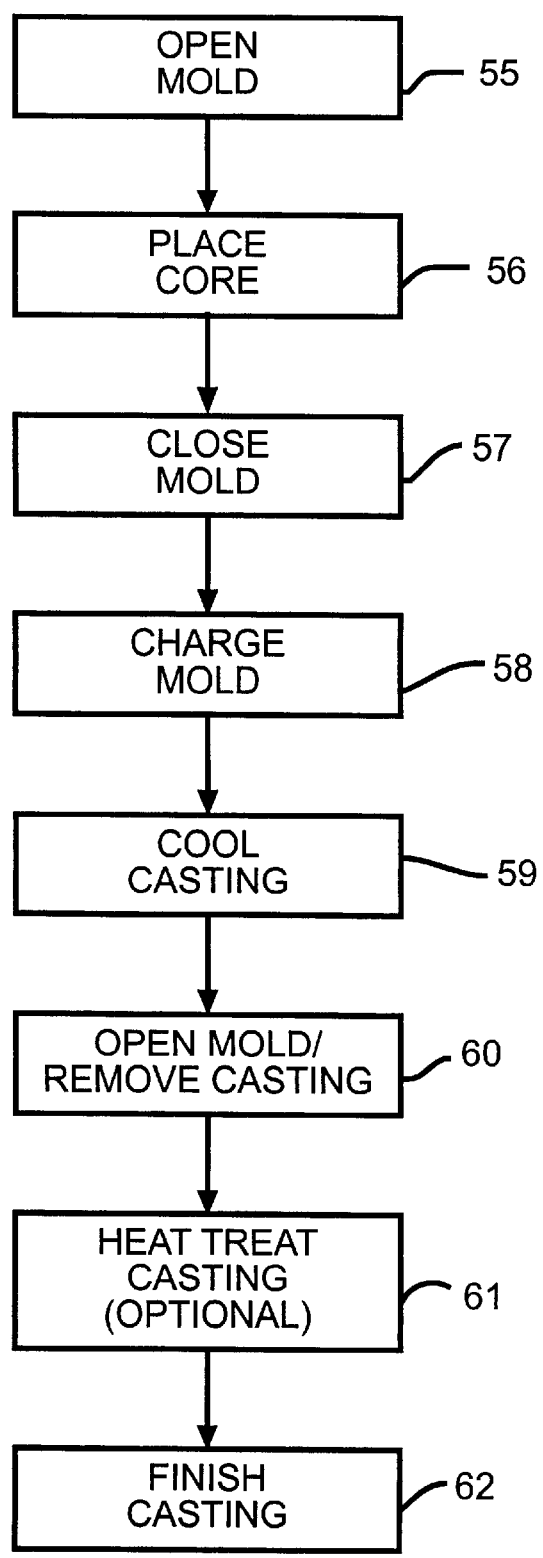
FIG. 4 is flow chart for a process for casting the wheel shown in FIG. 2.

The invention further contemplates a method for casting the wheel 30 shown in FIG. 2. The method is illustrated by the flow chart shown in FIG. 4. In functional block 55, a wheel mold is opened. A hollow sealed core is positioned in the mold in functional block 56 and the mold closed in functional block 57. A charge of molten metal is poured into the mold in functional block 58 to form a wheel casting which includes the core in the sidewall. It will be appreciated that any convention casting method, such as, for example, gravity or low pressure casting can be used in functional block 58. The casting is cooled in functional block 59 and once the metal has sufficiently solidified, the mold is opened in functional block 60. The casting is heat treated in functional block 61; however, this step is optional. Further finishing steps are carried out in functional block 62. Such steps can include removing risers and the gate from the casting, machining the casting to a final shape and applying optional layers of decorative and/or clear coatings.

Figure 5:
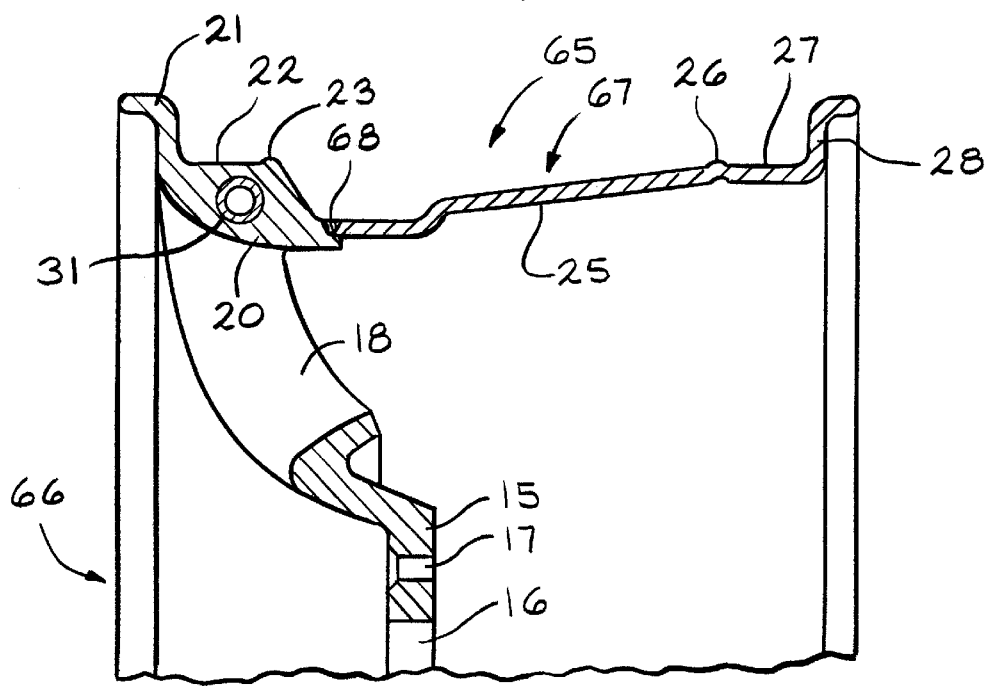
FIG. 5 is fragmentary sectional view of an improved two piece wheel in accordance with the present invention.

An alternate embodiment of the invention is illustrated by the fragmentary sectional view of a two piece wheel 65 in FIG. 5. Components shown in FIG. 5 which are similar to components shown in FIG. 3 have the same numerical designators. The wheel 65 includes a full face wheel disc 66 which is attached to the outboard end of a partial wheel rim 67 by an air-tight circumferential weld 68. Similar to the wheel 30 described above, the wheel 65 is cast from a light weight metal and includes a hollow annular lightener core 31 which is cast into the wheel sidewall 20.

The present invention provides a reduction in the weight of the wheel while utilizing unmodified existing wheel molds. Additionally, the present invention avoids the use of complex movable cores or expensive post casting machining to form a lightener recess, thereby reducing costs.

Figure 6:
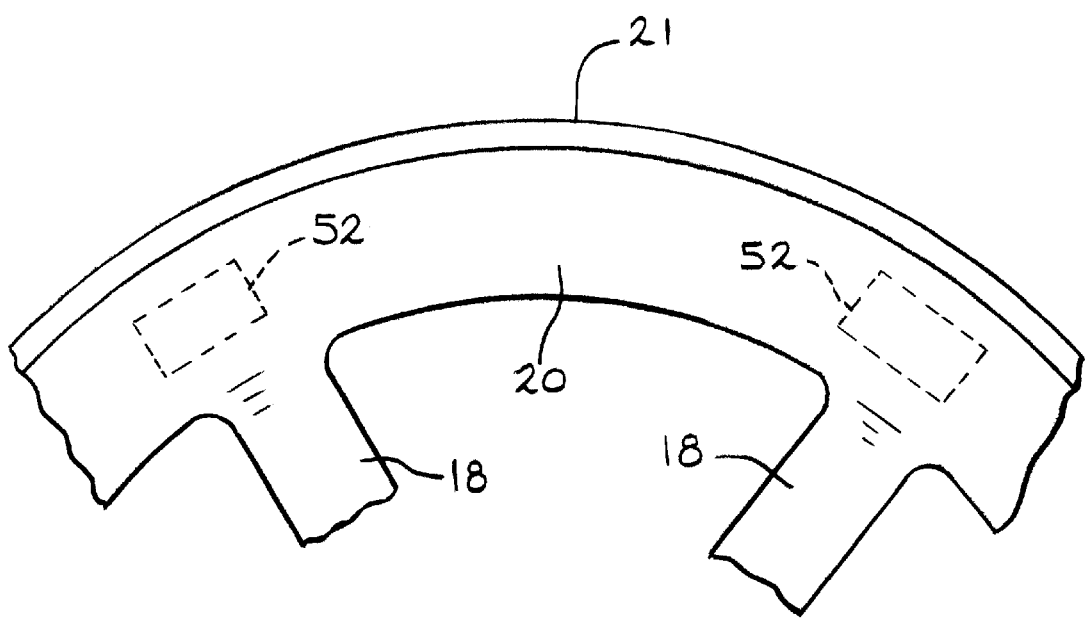
FIG. 6 is a fragmentary view of a vehicle wheel which illustrates an alternate embodiment of the wheel shown in FIG. 2.

While the preferred embodiment has been illustrated and described above with a continuous ring shaped hollow core, it will be appreciated that the invention also can be practiced with plurality of hollow core segments 52, as shown in FIG. 6. Components shown in FIG. 6 which are similar to components shown in the preceding figures have the same numerical identifiers. The core segments 52 are spaced equally about the circumference of the wheel sidewall. As illustrated, the core segments 52 are located in the portion of the sidewall 20 adjacent to the ends of the wheel spokes 18.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while a mold for a one piece wheel has been illustrated and discussed, it will be appreciated that the invention also can be practiced on a mold for a wheel component, such as, for example, a full face wheel disc.

What is claimed is:

1. A vehicle wheel comprising:
   an annular wheel rim adapted to support a pneumatic tire;
   a circular wheel disc formed across an end of said rim, said wheel disc cooperating with said wheel rim to define an annular sidewall; and
   a hollow core disposed within said sidewall, said hollow core having at least one tab extending therefrom, said tab supporting said core within said sidewall.

2. A vehicle wheel according to claim 1 wherein said hollow core is continuous and extends circumferentially within said sidewall.

3. A vehicle wheel according to claim 2 wherein said wheel disc and rim are cast from a metal alloy as a single piece.

4. A vehicle wheel according to claim 1 wherein said hollow core includes a plurality of segments spaced equally about the circumference of said sidewall.

5. A vehicle wheel according to claim 4 wherein said wheel disc includes a central hub supported within said wheel rim by a plurality of wheel spokes which extend radially from said hub to said sidewall and further wherein said hollow core segments are disposed within said side wall adjacent to the ends of said wheel spokes.

6. A vehicle wheel according to claim 4 wherein said wheel disc and rim are cast from a metal alloy as a single piece.

7. A vehicle wheel component comprising:
   an annular sidewall portion adapted to support a pneumatic tire bead;
   a circular wheel disc having a central hub supported within said sidewall portion by a plurality of radially extending spokes; and
   an arcuate shaped hollow core disposed within said sidewall portion, said hollow core having at least one tab extending therefrom, said tab supporting said core within said sidewall.

8. A vehicle wheel component according to claim 6 wherein the wheel component is a full face wheel disc.

9. A vehicle wheel component according to claim 8 wherein said hollow core is continuous and extends circumferentially within said sidewall.

10. A vehicle wheel component according to claim 9 wherein said vehicle wheel component is cast from a metal alloy.

11. A vehicle wheel component according to claim 8 wherein said hollow core includes a plurality of segments spaced equally about the circumference of said sidewall.

12. A vehicle wheel component according to claim 11 wherein said vehicle wheel component is cast from a metal alloy.

* * * * *